(12) United States Patent
Pfeiffer

(10) Patent No.: US 6,234,722 B1
(45) Date of Patent: May 22, 2001

(54) VACUUM SYSTEM FOR PARTICULATE MATERIALS AND AN EJECTOR DEVICE THEREFOR

(76) Inventor: John W. Pfeiffer, 714 Huddy Hill Rd., Hughesville, PA (US) 17737

(*) Notice: Subject to any disclaimer, the term of this patent is extended or adjusted under 35 U.S.C. 154(b) by 0 days.

(21) Appl. No.: 09/376,273

(22) Filed: Aug. 18, 1999

(51) Int. Cl.$^7$ .................................................. B65G 53/14
(52) U.S. Cl. ........................................ 406/153; 406/195
(58) Field of Search ................................ 406/153, 191, 406/194, 195

(56) References Cited

U.S. PATENT DOCUMENTS

| | | | |
|---|---|---|---|
| 2,955,880 | * | 10/1960 | Schlicksupp ........................... 302/58 |
| 3,853,079 | * | 12/1974 | Dunne ................................ 112/218 R |
| 5,769,572 | * | 6/1998 | Pfeiffer ................................ 406/153 |

* cited by examiner

Primary Examiner—Christopher P. Ellis
Assistant Examiner—Joe Dillon, Jr.
(74) Attorney, Agent, or Firm—Lalos & Keegan

(57) ABSTRACT

An ejector mountable on a planar wall of a housing for gathering and conveying particulate material to within such housing generally consisting of a flat base plate segment mountable on such planar wall member, a first set of flat plates joined together and with the base plate segment defining a converging fluid passageway, a second set of flat plate segments joined together and with the first set of plate segments and the base plate segment defining a restricted fluid passageway communicating with the converging fluid passageway and a third set of flat plate segments joined together and with the second set of plate segments and the base plate segment defining a diverging fluid passageway communicating with the restricted fluid passageway, one of the plate segments having a first inlet opening through which a stream of pressurized fluid may be injected into the converging and restricted fluid passageways, one of the plate segments having a second inlet opening through which fluid may be suctioned by a negative pressure created by a stream of pressurized air injected into the converging and restricted fluid passageways and one of the plate segments having an outlet opening communicable with the diverging fluid passageway.

10 Claims, 2 Drawing Sheets

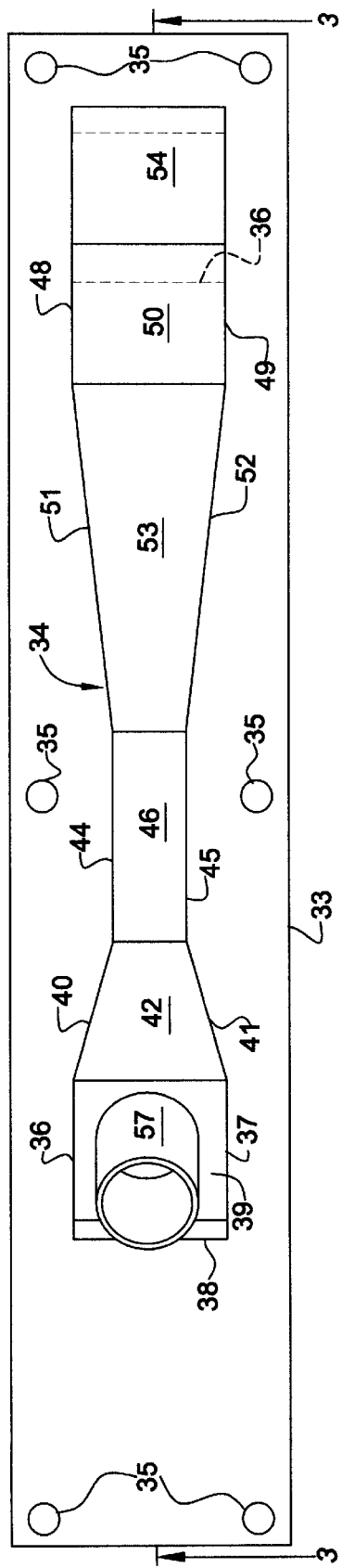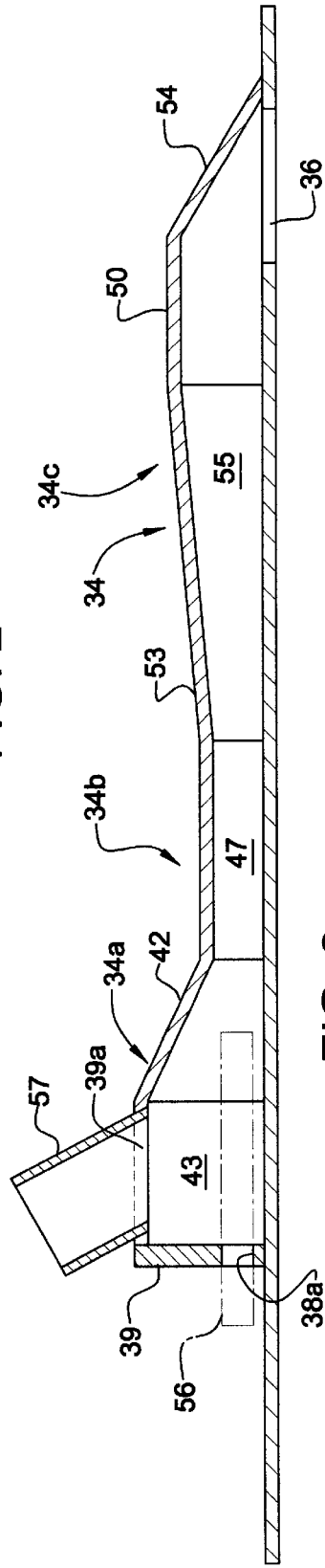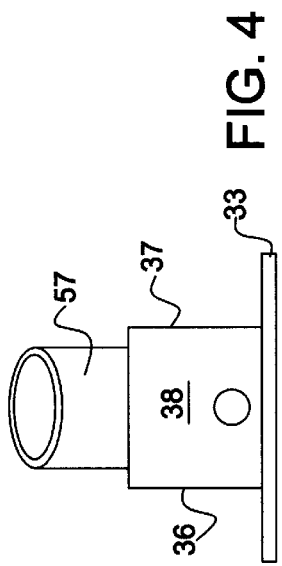

VACUUM SYSTEM FOR PARTICULATE MATERIALS AND AN EJECTOR DEVICE THEREFOR

This invention relates to a vacuum system for recovering particulate materials and more particularly to such a system having an improved ejector device as a component thereof.

BACKGROUND OF THE INVENTION

In the chemical process industry, there often is used a type of equipment in which particulate materials may be dumped for further handling, commonly referred to as a bag dump station. Such stations generally consist of a hopper having an inlet opening through which bags of particulate material may be dumped manually, and an outlet opening typically communicating with a pneumatic conveying line, and a filter unit disposed within the housing of the station and in communication with the interior of the hopper which operates to draw airborne particles in the vicinity of the hopper into the interior of the hopper.

In the use of such dump stations, it has been found that spillage of particulate material often occurs or that the particular material to be dumped is contained in large drums which often are too heavy to be manually lifted and dumped as with smaller bag material. In an effort to recover such spilled material and also to accommodate the handling of drums too heavy to be lifted and dumped, a vacuum system has been developed utilizing an ejector for vacuuming spilled material and material contained in heavy containers. An example of such a vacuum system and ejector is illustrated and described in U.S. Pat. No. 5,769,572.

Although the type of vacuum system and ejector disclosed in the aforementioned patent have been found to be highly effective in handling particulate material which has been spilled or contained in a heavy drum, the ejector therefor has been found to be comparatively costly to fabricate and mount on the hopper of such dump stations. Furthermore, because of the tubular construction of such ejectors, it has not been possible to utilize abrasive-resistant materials in fabricating such ejectors, which are advantageous and preferable to use because of the abrasive properties of many particulate materials with which such ejectors have been used.

SUMMARY OF THE INVENTION

It thus is the principal object of the present invention to provide an improved ejector and a system utilizing such an ejector, which may be more economically fabricated and mounted, and will be effective in handling abrasive materials. The aforestated objective of the invention is accomplished by forming such ejectors with flat pieces of metal welded together so that each of the diverging, restricted or throat and converging sections of the ejector defining a venturi have rectangular cross sectional configurations. The ejector preferably includes a base plate mountable on a wall of the station hopper, a first set of plates joined together and with the base plate defining a converging chamber, a second set of plates joined together and with the first set of plates and the base plate defining a restricted chamber communicating with the converging chamber, and a third set of plates joined together and with the second set of plates and the base plate defining a diverging chamber communicating with the restricted chamber. One of the plates is provided with a first inlet opening through which a stream of pressurized fluid may be ejected into the converging chamber, one of the plates is provided with a second inlet opening through which the fluid having entrained therewith a particulate material to be conveyed may be suctioned, and one of the plates has an outlet opening communicable with the diverging chamber. The device is mounted on the hopper of the dump station so that the outlet of the diverging chamber of the device registers with an opening in the hopper so that material conveyed through the ejector will be discharged into the interior of the hopper. The component plate sections of the ejector preferably are formed of an abrasive resistant metal to resist the erosive effect of abrasive materials conveyed through the ejector, and are welded together to facilitate the fabrication and mounting of the ejector.

BRIEF DESCRIPTION OF THE DRAWINGS

FIG. 2 is a top plan view of an ejector utilized in the system shown in FIG. 1;

FIG. 3 is a cross sectional view taken along line 3—3 in FIG. 2; and

FIG. 4 is an end view of the ejector shown in FIGS. 2 and 3.

DESCRIPTION OF THE PREFERRED EMBODIMENT OF THE INVENTION

Figure 1:
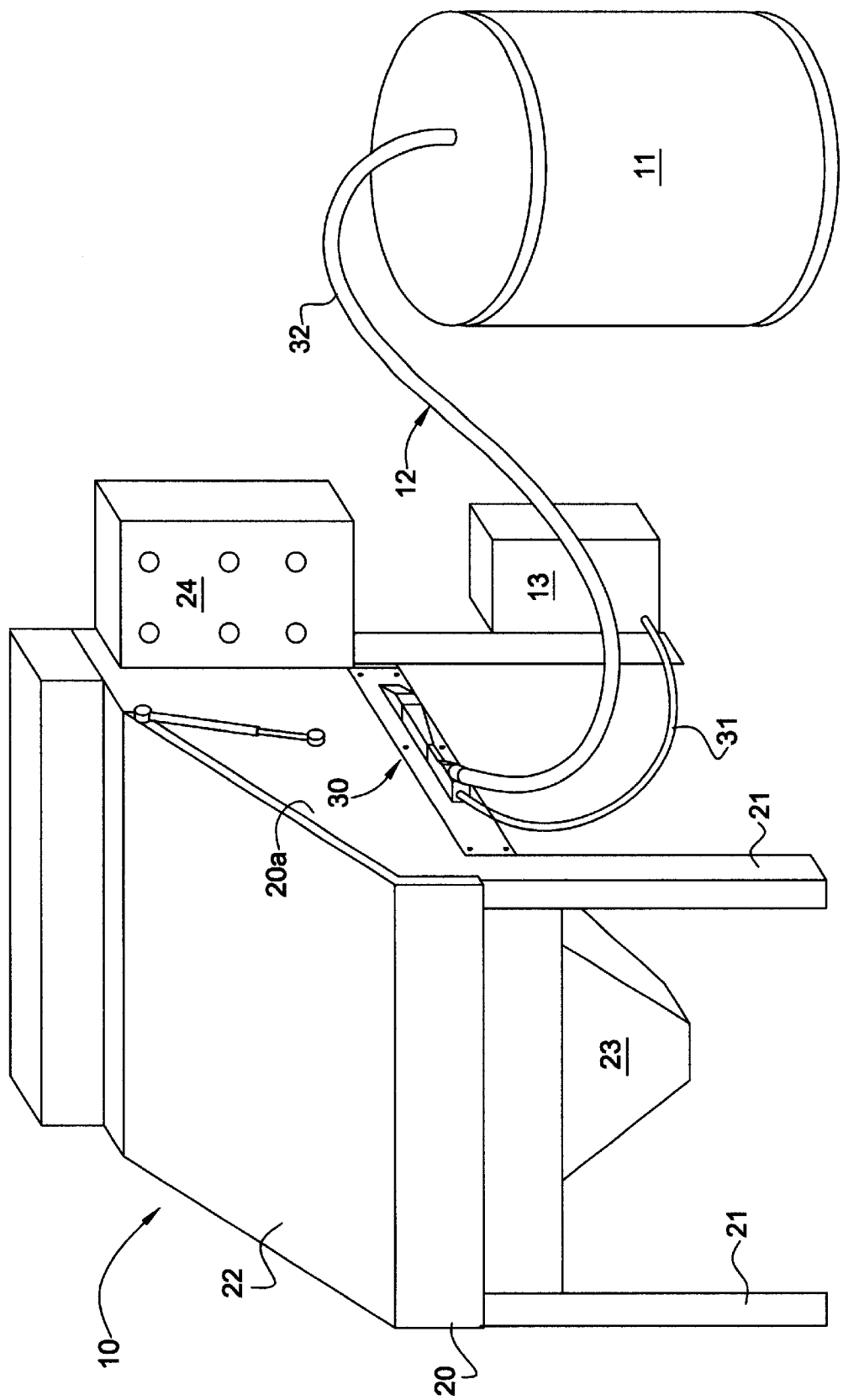
FIG. 1 is a perspective view of a vacuum system embodying the present invention, illustrating its use with a conventional bag dump station, a compressor and a drum containing a supply of particulate material to be withdrawn and conveyed to the hopper of the dump station.

Referring to FIG. 1 of the drawings, there is illustrated a conventional bag dump station 10, a drum 11 containing a supply of a particulate material to be conveyed to the dump station, a vacuum system 12 for conveying the particulate material from the drum to the dump station and a compressor 13 providing the motive power for the vacuum system. The dump station essentially consists of a housing 20 supported on a set of legs 21, a door panel 22 which may be swung open to provide an inlet opening, and a depending hopper 23 communicating at its upper end with the interior of the housing and having an outlet opening at the lower end thereof communicable with the pneumatic conveying line or another structure for receiving particulate material dumped into and through the dump station. Disposed within the housing is a filter unit with an induction fan which functions to draw air through the inlet opening of the housing when panel 22 is opened for entraining airborne particles of material being dumped into the housing. A control panel 24 is mounted on the housing of the station and may be operated to control the operation of the filter unit.

In the operation of the dump station as described, door panel 22 is first opened to expose a grate disposed across the inlet opening of the housing. The bag to be dumped is then placed on the grate and is opened to permit the material to gravity flow through the grate and into the hopper section of the station. An air stream created by the fan within the housing travels at 135–235 feet per minute across the inlet opening of the housing to capture and entrain fine airborne particles emanating from the contents of the bag being dumped, and carry them through the inlet opening and to the filter unit within the housing. Captured particles are collected on the exterior of the filter bags of the filter unit while clean filtered air is exhausted to the atmosphere at the upper end of the station. Particles collected on the filter bags are automatically removed by pulses of compressed air introduced into the filter bags. The particles removed from the filter bags are caused to gravity flow to the hopper section and be discharged through the outlet thereof.

Vacuum system 12 consists of an ejector 30, a flexible fluid line 31 inter-communicating the ejector and compressor 13 and a flexible fluid line 32 connected at one end to or with the ejector and having a free end open to the atmosphere which may be used to vacuum spilled particulate material in the vicinity of the dump station and material contained in drum 11. Ejector 30 essentially consists of a venturi. It is best illustrated in FIGS. 2 through 4 and includes a flat base plate 33 mountable on a side wall 20a of the station housing, and a component structure 34 mounted on the base plate. The base plate is provided with a set of bolt holes 35 about the perimeter thereof for securing the ejector to the station housing, and an opening 36 at one end thereof which registers with an opening in side wall 20a of the station housing to thereby communicate with the interior of the housing including hopper section 23. Structure 34 includes a converging section 34a, a restricted or throat section 34b and a diverging section 34c. Converging section 34a is formed of a set of flat wall segments joined together and to the base plate, and includes a pair of parallel, transversely spaced side wall segments 36 and 37, a rear wall segment 38, a top wall segment 39, a pair of transversely spaced, converging side wall segments 40 and 41 and a trapezoidially configured top wall segment 42 inclined toward the base plate. The plate segments forming the converging section define a converging chamber or passageway 43. Restricted or throat section 34b is formed of a set of flat wall segments joined together and with segments of converging sections 34a and the base plate, and includes a pair of parallel, transversely spaced side wall segments 44 and 45 and a rectangularly configured top wall segment 46. The wall segments of the restricted or throat section define a restricted chamber or passageway 47 disposed in longitudinal alignment and communicating with chamber or passageway 43. Diverging section 34 similarly is formed of a set of flat wall segments joined together and with segments of the restricted or throat section and the base plate, and includes a pair of parallel, transversely spaced side wall segments 48 and 49, a rectangularly configured top wall 50, a pair of transversely spaced, diverging side wall segments 51 and 52, a trapezoidially configured top wall segment 53 and an inclined, rectangularly configured end wall segment 54 which is disposed at an angle to the base plate and extends over a portion of outlet opening 36 in the base plate. The wall segments of the diverging section are joined together and with the wall segments of the restricted or throat section and the base plate to form a diverging channel or passageway 55 disposed in alignment and communicating with restricted or throat passageway 47 and communicating with outlet opening 36.

As best seen in FIGS. 3 and 4, end wall segment 38 is provided with an inlet opening 38a through which there is inserted a tubular member 56. The outer end of conduit 56 protrudes outwardly from end wall segment 38 and is adapted to have an end of flexible fluid line 31 fitted thereon. The inner end of conduit 56 extends through a major portion of the converging passageway and is adapted to inject a stream of pressurized air through passageways 43, 47 and 45 when the compressor is operated and air under pressure is applied to fluid line 31. Air injected through the ejector in such manner is discharged through outlet opening 36 into the station housing in the hopper section thereof.

Top wall segment 39 also is provided with an inlet opening 39a and a short tube segment 57 secured to the top wall segment and communicating with passageway 43 through inlet opening 39a. One end of fluid line 32 is adapted to be fitted onto conduit 57, as shown in FIG. 1.

In the operation of the vacuum system as described, with fluid line 31 interconnecting the inlet end of conduit 56 of the ejector and compressor 13, and one end of fluid line 12 connected to conduit segment 57 of the ejector and the compressor being operated, fluid under pressure will be caused to be injected into and through the ejector and into the station housing through outlet opening 36, creating a negative pressure in fluid line 32. By placing the free end of fluid line 32 either along the floor in the vicinity of the dump station where spilled particulate material may be located or in the vicinity of such material in drum 11, the negative pressure in fluid line 12 will cause such material to be suctioned through fluid line 12 into and through diverging passageway 43 and restricted passageway 47 to be entrained in the air injected through the ejector and discharged through outlet opening 36 into the station housing. As air entrained with particulate material traverses through diverging passageway 55, it will be caused to impinge upon inclined end wall segment 54 and be diverted to and through outlet opening 36.

It is contemplated that the base plate and the various wall segments of the ejector be formed of a metal and welded together. Because of the abrasive properties of many particulate materials it is preferred that the base plate and the various wall segments be formed of an abrasion-resistant steel. It further is contemplated that the base plate and flat wall segments of the ejector be stamped or cut from a suitable sheet or plate metal, fixtured and welded together. The formed ejector may be mounted on the side wall of the station housing merely by positioning the base plate thereof against the side wall of the station housing with outlet opening 36 registered with a suitable opening provided in the side wall of the station housing, and then securing the base plate portion of the ejector to the side wall of the station housing by means of studs, rivets or welding. Upon mounting the ejector on the station housing the installation may be completed merely by interconnecting fluid line 31 between the compressor and the ejector and fitting one end of fluid line 32 to the ejector. Any suitable compressor may be used including compressors generally available in manufacturing facilities with capacities for producing pressures in the range of 80 to 120 psig.

The construction of the ejector as described has a number of advantages. Because the ejector body is rectangular instead on circular in cross-section, it makes forming the ejector from flat sheet metal less time consuming, requiring less skill in layout and forming. It makes possible the use of specialized abrasion resistant metals which are readily available in flat sheet form but cannot easily be formed into cylindrical or conical shapes. The rectangular cross-sectional configuration of the ejector also allows the ejector to be designed with a lower height profile and facilitates its mounting against a flat surface compared to an ejector having a circular cross-sectional configuration. Another feature of the construction is the position of the centerline of the motive gas and the restricted passageway which are offset toward the base plate. Such arrangement further simplifies the construction of the ejector in that one side is simply a flat plate. A further feature of the construction is the deflected outlet end of the ejector. This feature eliminates the requirement of a separate pipe elbow as required by prior art ejectors comparable to the present invention.

From the foregoing detailed description it will be evident that there are a number of changes, adaptations, and modifications of the present invention which come within the province of those persons having ordinary skill in the art to which the aforementioned invention pertains. However, it is intended that all such variations not departing form the spirit of the invention be considered as within the scope thereof as limited solely by the appended claims.

What is claimed is:

1. A system for vacuum conveying particulate material to a housing having a planar wall member comprising:

an ejector comprising a base plate segment adapted to be mounted on said planar wall member, a first set of plate segments joined together and with said base plate segment defining a converging fluid passageway, a second set of plates joined together and with said first set of plate segments and said base plate segment defining a restricted fluid passageway communicating with said converging fluid passageway and a third set of plate segments joined together and with said second set of plate segments and said base plate segment defining a diverging fluid passageway communicating with said restricted fluid passageway, one of said plate segments having a first inlet opening through which a stream of pressurized fluid is injected into said converging and restricted fluid passageways, one of said plate segments having a second inlet opening through which a fluid containing said particulates is suctioned by negative pressure created by said injection of a stream of pressurized fluid into said converging and restricted fluid passageways and one of said plate segments having an outlet opening intercommunicating said diverging fluid passageway and a registered opening in said planar wall member when said ejector is mounted on said planar wall member;

a first fluid line interconnected between said first fluid opening of said ejector and a source of compressed fluid which provides said pressurized fluid; and a second fluid line adapted to be connected at one end thereof to said second inlet of said ejector.

2. A system according to claim 1 including a conduit projecting through said first inlet opening of said ejector, disposed in longitudinal alignment with said restricted fluid passageway, to which said first fluid line may be connected.

3. A system according to claim 1 wherein at least one of said sets of plates of said ejector cooperating with said base plate segment thereof has a rectangular cross-sectional configuration.

4. A system according to claim 1 wherein said plate segments of said ejector are formed of a metal and are welded together.

5. A system according to claim 1 wherein said plate segments of said ejector are formed of an abrasion-resistant metal.

6. A system according to claim 1 wherein said first inlet opening of said ejector is disposed in longitudinal alignment with said restricted fluid passageway of said ejector.

7. A system according to claim 1 wherein said outlet opening of said ejector is disposed in said base plate segment thereof.

8. A system according to claim 7 wherein said outlet opening is registrable with said opening in said planar wall member when said base plate segment of said ejector is mounted thereon.

9. A system according to claim 1 wherein a plate segment of said third set of plates of said ejector is positioned to direct fluid injected through said restricted fluid passageway into said diverging fluid passageway of said ejector, towards said outlet opening therein.

10. A system according to claim 9 wherein said plate segment comprises an end wall of said ejector disposed at an angle relative to said base plate segment thereof.

* * * * *